T. W. C. BEATTIE.
FEED CONTROL MECHANISM.
APPLICATION FILED JAN. 31, 1921.

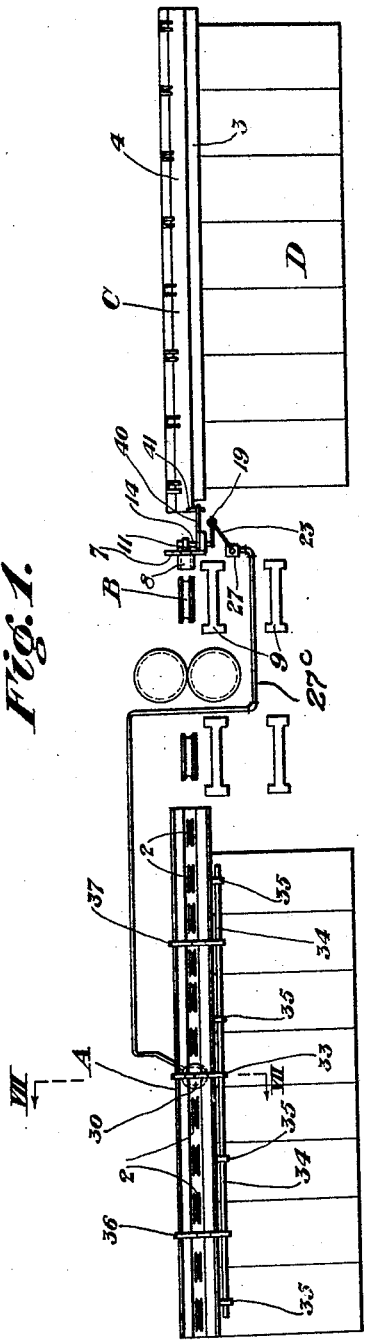

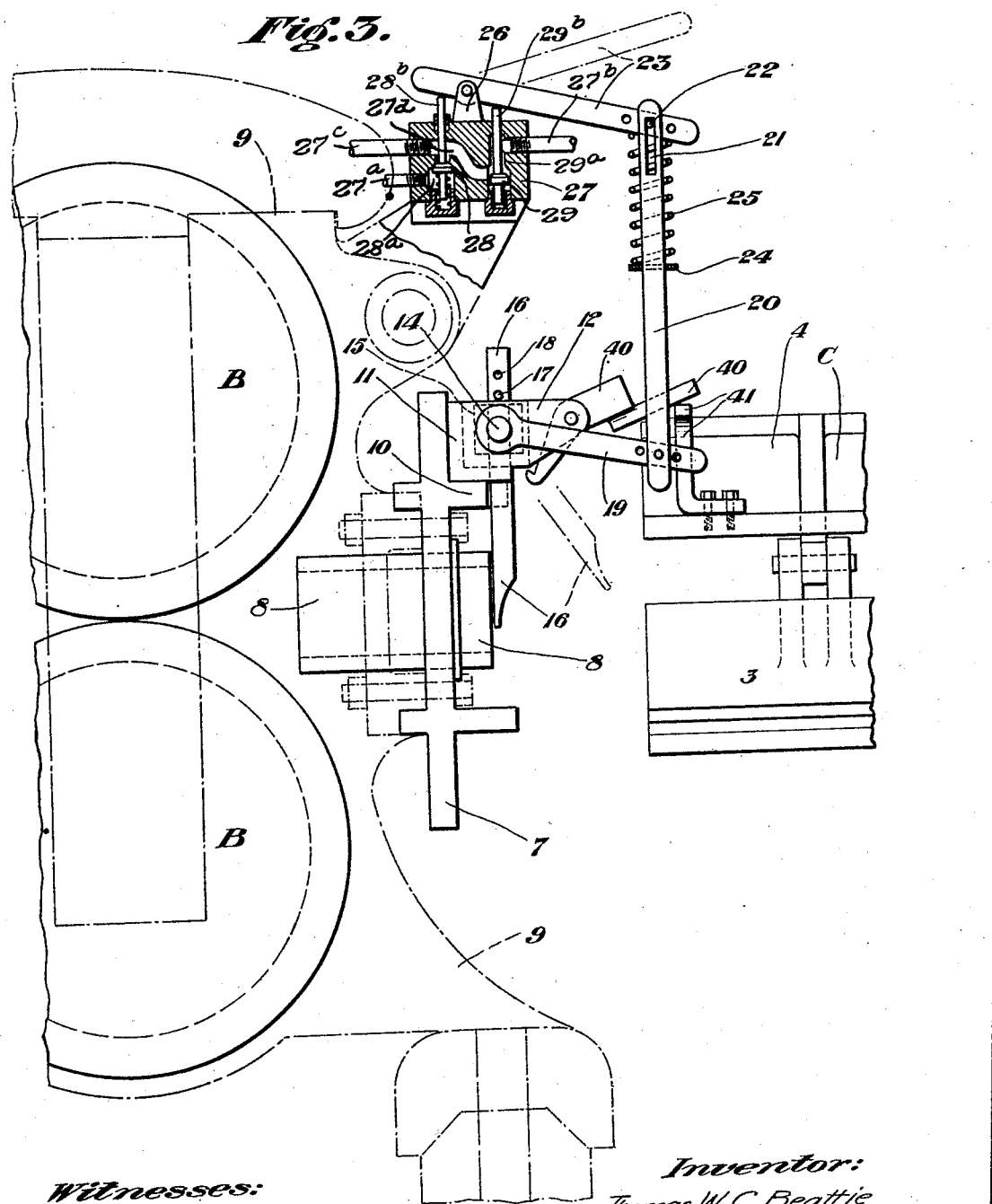

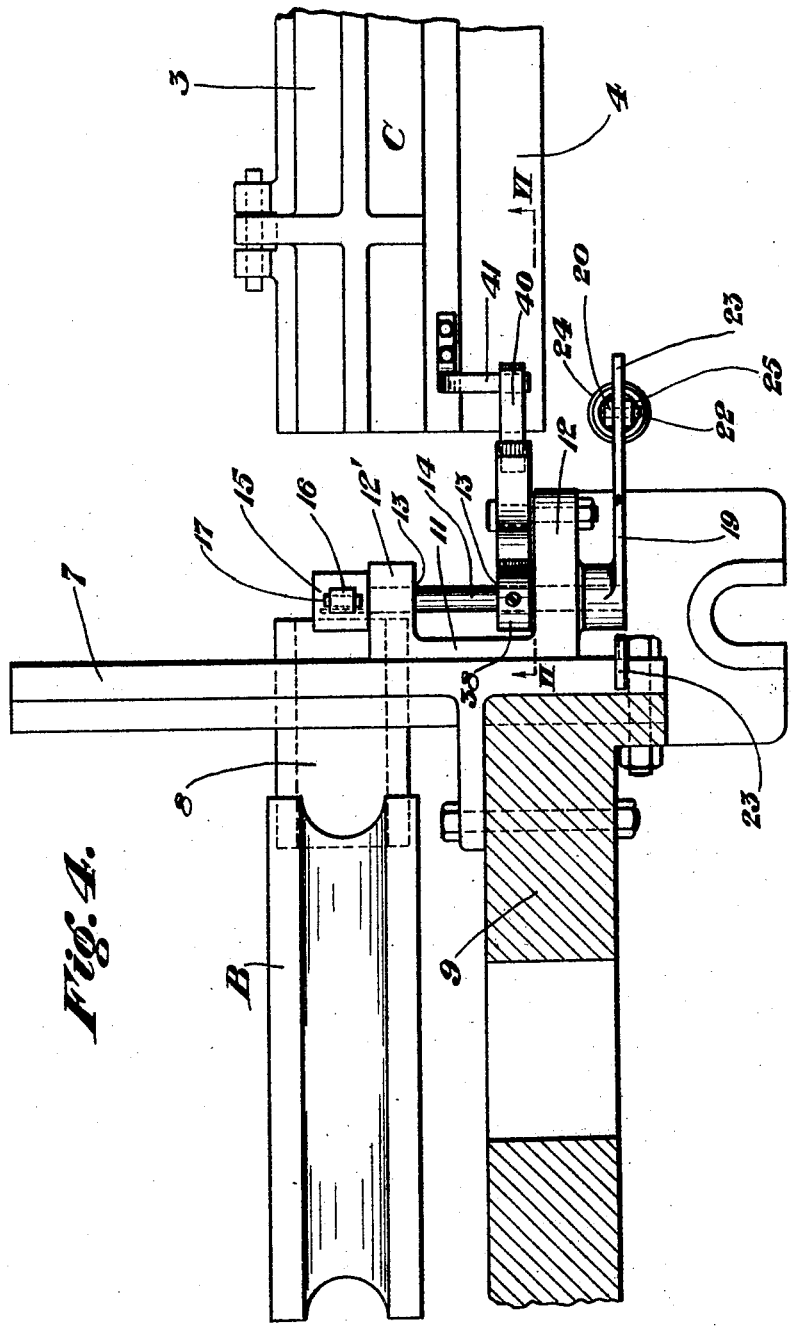

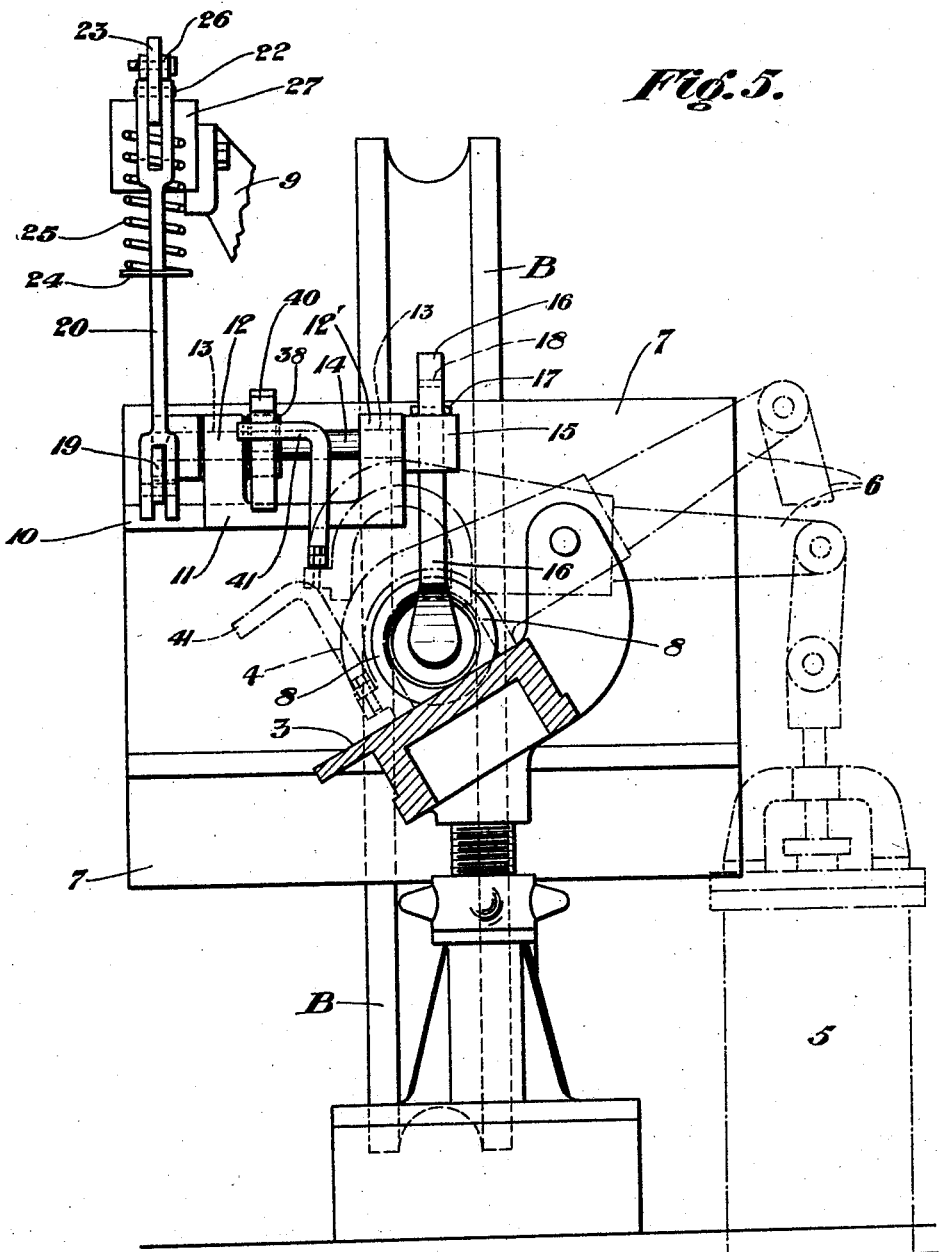

1,411,400.

Patented Apr. 4, 1922.

Witnesses:
Edwin Trueb

Inventor:
Thomas W. C. Beattie.
By: D. Anthony Usina
Atty.

UNITED STATES PATENT OFFICE.

THOMAS W. C. BEATTIE, OF WHEELING, WEST VIRGINIA, ASSIGNOR TO NATIONAL TUBE COMPANY, OF PITTSBURGH, PENNSYLVANIA, A CORPORATION OF NEW JERSEY.

FEED-CONTROL MECHANISM.

1,411,400.     Specification of Letters Patent.     Patented Apr. 4, 1922.

Application filed January 31, 1921. Serial No. 441,258.

*To all whom it may concern:*

Be it known that I, THOMAS W. C. BEATTIE, a citizen of the United States, and resident of Wheeling, in the county of Ohio and State of West Virginia, have invented certain new and useful Improvements in Feed-Control Mechanisms, of which the following is a specification.

This invention relates to pipe mills, and more particularly to an improved automatic feed control mechanism for controlling the feed of pipe through the sizing rolls and into the dump trough of the cooling table.

The principal object of the present invention is to produce a mechanism of this class that will be entirely automatic in operation, and a mechanism that will positively prevent the passage of more than one pipe within the dumping trough at one time, and also prevent the passage of pipe into the dumping trough when it is open to discharge another pipe.

A still further object is to provide a mechanism of this class that is composed of few parts, thereby providing a mechanism that is simple, durable, and inexpensive, and especially adapted to use in a pipe mill where it will be subjected to extreme heat and rough usage.

Heretofore in existing pipe mills an operator has been employed to manually hold back the on-coming pipe, should the preceding pipe fail to clear the sizing rolls or the dumping trough, and regardless of how expert this operator may be, he could not always control the pipe and numerous jams occurred, which were very costly, since they delayed the operation of the mill and produced a large amount of scrap.

The present invention entirely eliminates the disadvantages of the old mill systems and causes a more efficient operation than was heretofore possible.

Other objects and advantages will be brought out in the following specification and illustrated in the accompanying drawings, in which—Figure 1 is a top plan view of the in-going trough and cooling table of a pipe mill.

Figure 2 is a side elevation thereof.

Figure 3 is an enlarged detail side elevation of the automatic control mechanism.

Figure 4 is an enlarged top plan of the mechanism of Figure 3.

Figure 5 is a sectional elevation through the dumping trough showing the control mechanism.

Figure 6:
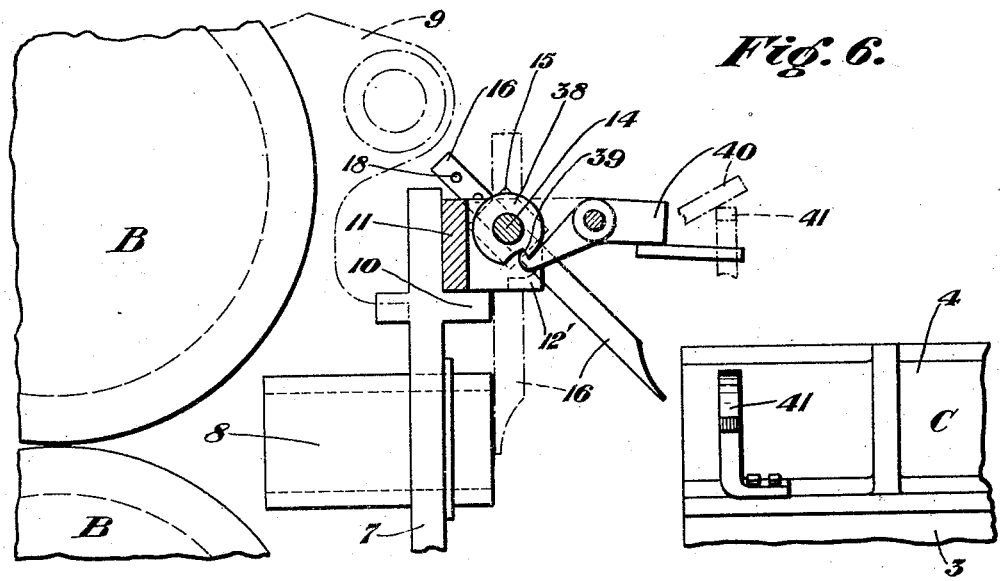
Figure 6 is a detail sectional view through the control mechanism to illustrate details of the latch mechanism.
Figure 7:
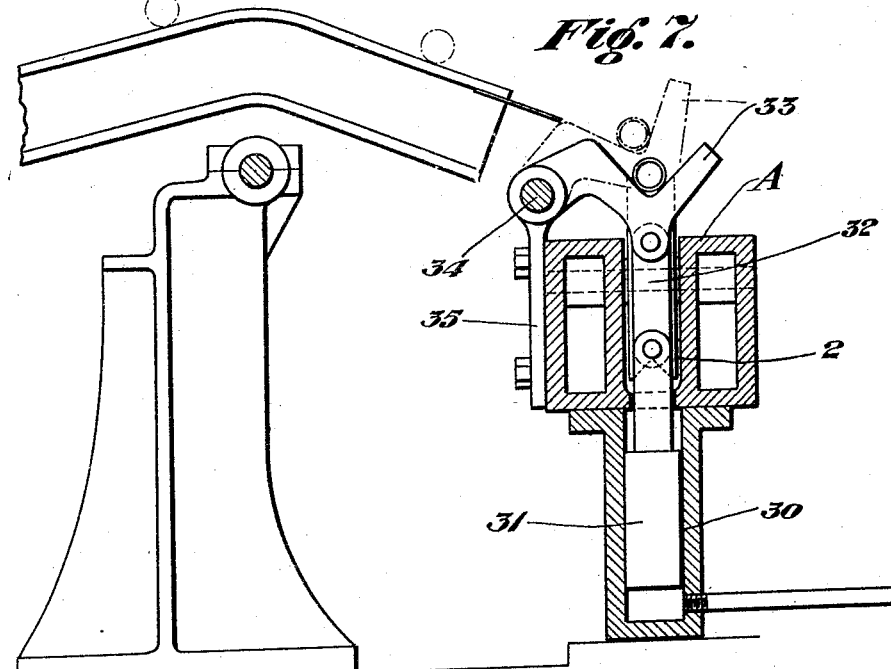
Figure 7 is a cross sectional elevation on the line VII—VII of Figure 1.

Referring particularly to the drawings, the letter A designates the in-going trough of a pipe mill which conveys the pipe to the sizing rolls B, from which it passes to the dumping trough C of a cooling table, a portion of which is shown in Figure 1 and marked D.

The trough A is V-shaped in cross section, and has a plurality of supporting feed rollers 2 journaled therein adapted to convey or feed the pipe forward to the sizing rolls B, which are of any well known and preferred construction.

The dump trough C of the cooling table is of ordinary construction and comprises an inclined flat bottom 3 and a hinged cover or tunnel member 4 adapted to be raised and lowered by means of an air cylinder 5 and levers 6.

The rolls B are overhung from housing 9 and a suitable supporting bracket plate 7 is bolted to the housing 9 and supports a thimble or guide 8 between the rolls B and dumping trough C.

Plate 7 is also provided with a ridge or projection 10 to support a substantially U-shaped casting 11, having one side 12 of greater length than its other side 12'.

The side portions 12 and 12' each are provided with bearing apertures 13 for the reception of shaft 14 which projects an appreciable distance beyond the side portions 12 and 12' and is provided with a squared head 15 on the end abutting the side portion 12'.

The squared head 15 is provided with a squared vertically extending aperture for the reception of a lever or trigger 16 which is held vertically adjustable by means of a pin 17 passing through one of a plurality of apertures 18.

The lever or trigger extends downwardly across the mouth or outlet of the thimble or guide 8, and is adapted to be rocked by the pipes as they pass through the thimble to the dump trough, thereby revolving the shaft 14 a part of a revolution.

A lever 19 is keyed on the opposite end of shaft 14 from the trigger 16 and has its free end pivotally engaged in the lower forked end of an upright lever 20 which has its upper end forked and the forked portion provided with a slot 21 to receive a pin or pivot 22 passing through another substantially horizontal lever 23. The lever 20 is provided with a shoulder 24, intermediate its ends, and a coil spring 25 is mounted around the lever and has its lower end abutting the shoulder and its upper end abutting the lever 23, thereby combining with the slotted forked portion of lever 20 and pin 22 to provide a flexible pivotal connection between the levers 20 and 23 to allow for the differences in angle traveled by lever 16 and lever 23.

The lever 23 is pivotally connected intermediate its ends on a rigid standard 26 on a three-way double piston air valve 27, having spring pressed pistons 28 and 29 controlling inlet and exhaust ports $28^a$ and $29^a$ respectively. The pistons 28 and 29 have stems $28^b$ and $29^b$ projecting upwardly through the valve casing on opposite sides of the standard 26, and abutting the bottom face of the lever 23 so that as said lever is rocked the pistons 28 and 29 will be reciprocated in opposite directions, one being moved to open position while the other is closed.

An inlet or fluid supply pipe $27^a$ leads into the inlet port $28^a$ from any suitable source of supply (not shown), and an exhaust pipe $27^b$ leads from the exhaust port $29^a$, while a pipe $27^c$ leads from a port or passage $27^d$ to an air cylinder 30. The pipe $27^c$ serves as both a feed and exhaust pipe for the cylinder 30, and the port or passage $27^d$ connects both the inlet and exhaust ports.

The cylinder 30 is located approximately midway of the in-going trough, and the cylinder piston 31 is operatively connected by a link 32 to a V-shaped lever or arm 33 keyed on a shaft 34 journaled in suitable brackets 35 spaced along the trough. Other levers or arms 36 and 37 are keyed adjacent each end of the shaft 34 in line with the lever 33. The levers 33, 36, and 37 are so positioned on the shaft 34 that they normally lie below the top plane of the feed rollers 2 and are adapted to be raised above this plane only when air is admitted to the cylinder 30 which will rock the shaft 34. When the shaft 34 is rocked and levers or arms 33, 36, and 37 are raised, they will lift the pipe being fed toward the rolls B from the rollers 2 and hold it stationary until the air is again released from the cylinder 30 and the levers or arms allowed to return to their normal position.

A collar or disk 38 is keyed on shaft 14 and has its periphery provided with a notch or slot 39 adapted to be engaged by a lever or latch 40 pivotally mounted at a point forward of its center on the long side 12 of casting 11, and being so positioned that its forward end will extend beyond and normally bear against the periphery of the collar or disk 38. The rear end of the lever 40 is of reduced cross section and extends rearward into the path of an operating arm or lever 41 which is secured to the dump trough cover 4, and adapted to strike the lever 40 when the dump trough cover is raised to release a pipe.

When a pipe strikes trigger 16, shaft 14 is rotated and levers 19 and 20 are operated to rock lever 23, thus forcing the piston 28 to move downwardly to open the inlet port $28^a$, and the piston 29 to move upwardly to close the exhaust port $29^a$. When the valve has thus operated air will flow through the port $28^a$ into the passage $27^d$ and through the pipe $27^c$ to the cylinder 30, causing said cylinder to operate and rotate shaft 34, thereby raising the levers or arms 33, 36, and 37 so as to lift the on-coming pipe clear of the feed rollers. As shaft 14 is rotated, the collar or disk 38 will be rotated until the notch 39 comes opposite the point of the latch 40, at which point the latch will engage in the notch, thus holding the lever mechanism in its raised position and the valve 27 open. The lever mechanism will remain locked in its raised position, and valve 27 will remain open, thereby holding the levers or arms 33, 36 and 37 and the on-coming pipe in their raised position clear of the feed rollers until the latch is released by the arm or lever 41 striking the rear end of lever or latch 40 as the dump trough cover is raised to discharge a pipe. When the latch 40 is released the levers 19 and 20 will move downwardly, rocking the lever 23, thus reversing the position of the pistons 28 and 29 of the valve 27 and closing the inlet port $28^a$ and opening the exhaust port $29^a$, thus cutting off the fluid pressure to the cylinder 30. The air in the cylinder will then exhaust through the port $29^a$ and permit the arms 33, 36, and 37 to fall and return the on-coming pipe to the feed rollers 2.

From the above it will be readily apparent that I have provided an automatic feed control that is positive in action and of the highest general efficiency.

While I have shown and described in detail one embodiment of my invention, it will be expressly understood that I do not wish to be limited to this exact construction, since it is only illustrative and various changes in the combination and arrangement of parts, and minor changes in design will readily suggest themselves to those skilled in the art, and may be made without departing from the spirit of my invention as defined in the appended claims.

I claim:—

1. The combination with a pipe mill comprising an in-going feed trough, a pair of sizing rolls, a dump trough, and a cooling table, of means operated by the pipe as it passes from said sizing rolls to said dump trough for holding the next succeeding pipe in said in-going feed trough until the actuating pipe has cleared the sizing rolls and been discharged from said dump trough.

2. The combination with a pipe mill having an in-going feed trough provided with feed rollers, a pair of sizing rolls, a dump trough, and a cooling table, of means for controlling the feed pipe from said in-going feed trough through said sizing rolls and onto said dump trough, said means comprising a plurality of lifter arms journaled in said trough and adapted to be rocked to lift the pipe being fed from said feed rollers, means for actuating said lifter arms, and means for controlling said actuating means.

3. In a pipe mill having an in-going feed trough provided with feed rollers, a pair of sizing rolls, a dump trough, and a cooling table, means for controlling the feed of pipe from said in-going feed trough through said sizing rolls and onto said dump trough, said means comprising a plurality of lifter arms keyed upon a shaft journaled along said feed trough, said shaft being adapted to be rocked to raise said arms and lift the pipe being fed clear of said feed rolls, an air cylinder connected with and adapted to rock said shaft, a valve for controlling the air flow to and from said cylinder, lever mechanism for actuating said valve, a trigger connected with and adapted to operate said lever mechanism to open said valve, said trigger being adapted to be actuated by the pipe passing from said sizing rolls to said dump trough, means for locking said lever mechanism in its open valve position, and means carried by the cover of said dump trough adapted to release said lever mechanism allowing it to close said valve and open the exhaust when said dump trough cover is raised to discharge the pipe.

4. In a pipe mill having an in-going feed trough provided with feed rollers, a pair of sizing rolls, a dump trough, and a cooling table, means for controlling the feed of pipe from said in-going feed trough through said sizing rolls and onto said dump trough, said means comprising a plurality of lifter arms keyed upon a shaft journaled on said feed trough, said arms being normally below the upper plane of said feed rollers, said shaft being adapted to be rocked to raise said arms and lift the pipe being fed clear of said feed rollers, means for rocking said shaft, and automatic means for controlling said rocking means.

5. In a pipe mill having an in-going feed trough provided with feed rollers, a pair of sizing rolls, a dump trough and a cooling table, means controlling the feed of pipe from said in-going feed trough through said sizing rolls and onto said dump trough, said means comprising a plurality of lifter arms keyed upon a shaft journaled on said feed trough, said arms being normally below the upper plane of said feed rollers, said shaft being adapted to be rocked to raise said arms and lift the pipe being fed clear of said feed rollers, an air cylinder connected with and adapted to rock said shaft, a valve for controlling the air flow to and from said cylinder, and means for automatically operating said valve.

6. In a pipe mill having an in-going feed trough provided with feed rollers, a pair of sizing rolls, a dump trough, and a cooling table, means for controlling the feed of pipe from said in-going feed trough through said sizing rolls and onto said dump trough, said means comprising a plurality of lifter arms keyed upon a shaft journaled on said feed trough, said arms being normally below the upper plane of said feed rollers, said shaft being adapted to be rocked to raise said arms and lift the pipe being fed clear of said rollers, an air cylinder connected with and adapted to rock said shaft, a valve for controlling the air flow to and from said cylinder, and an automatically operated lever mechanism for actuating said valve.

In testimony whereof, I have hereunto signed my name.

THOMAS W. C. BEATTIE.